Aug. 8, 1961 C. M. ANGEL ET AL 2,995,032
MOBILE AXLE FLAW DETECTOR UNIT CARRIER
Filed June 7, 1955 3 Sheets-Sheet 1
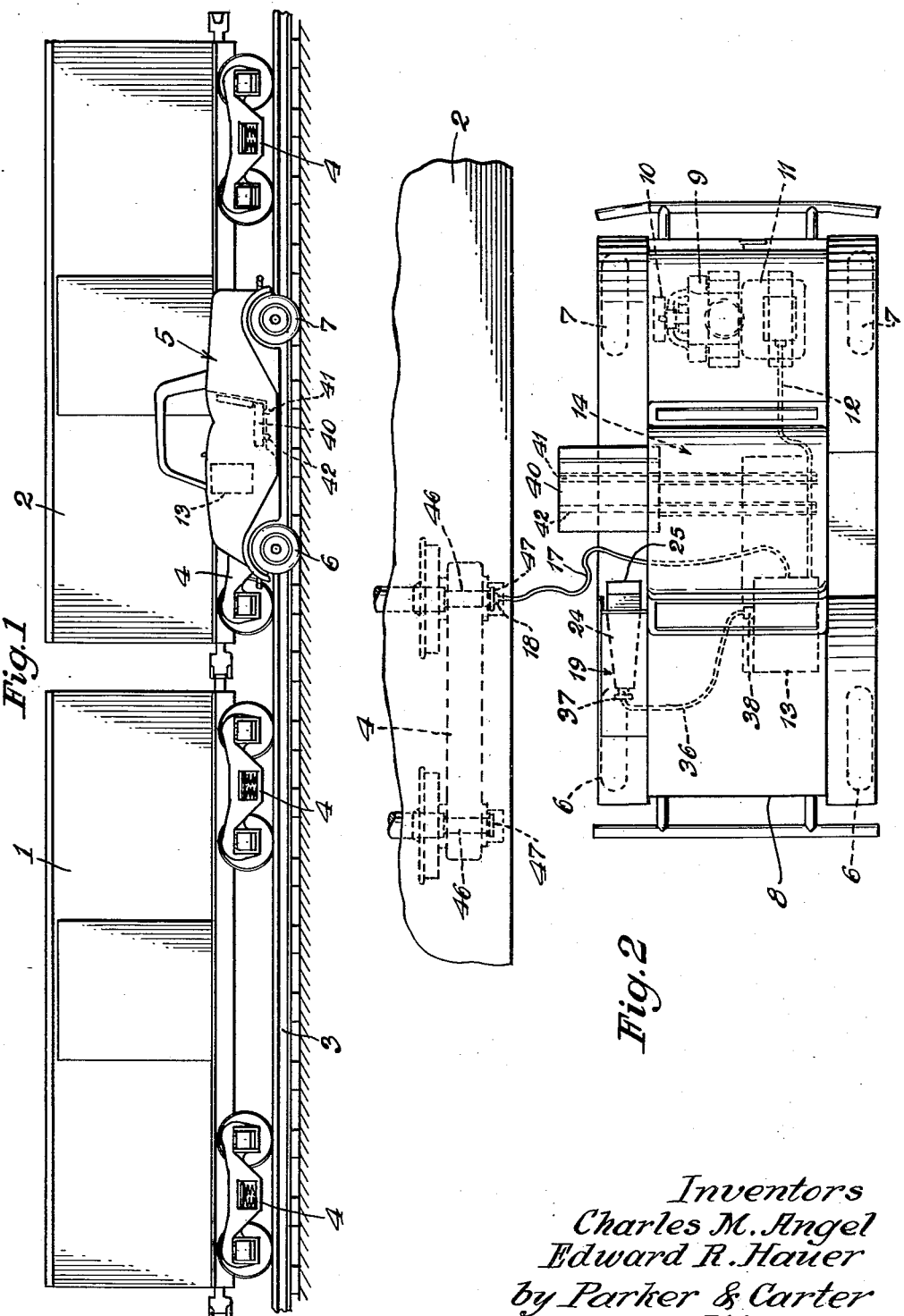
Inventors
Charles M. Angel
Edward R. Hauer
by Parker & Carter
Attorneys

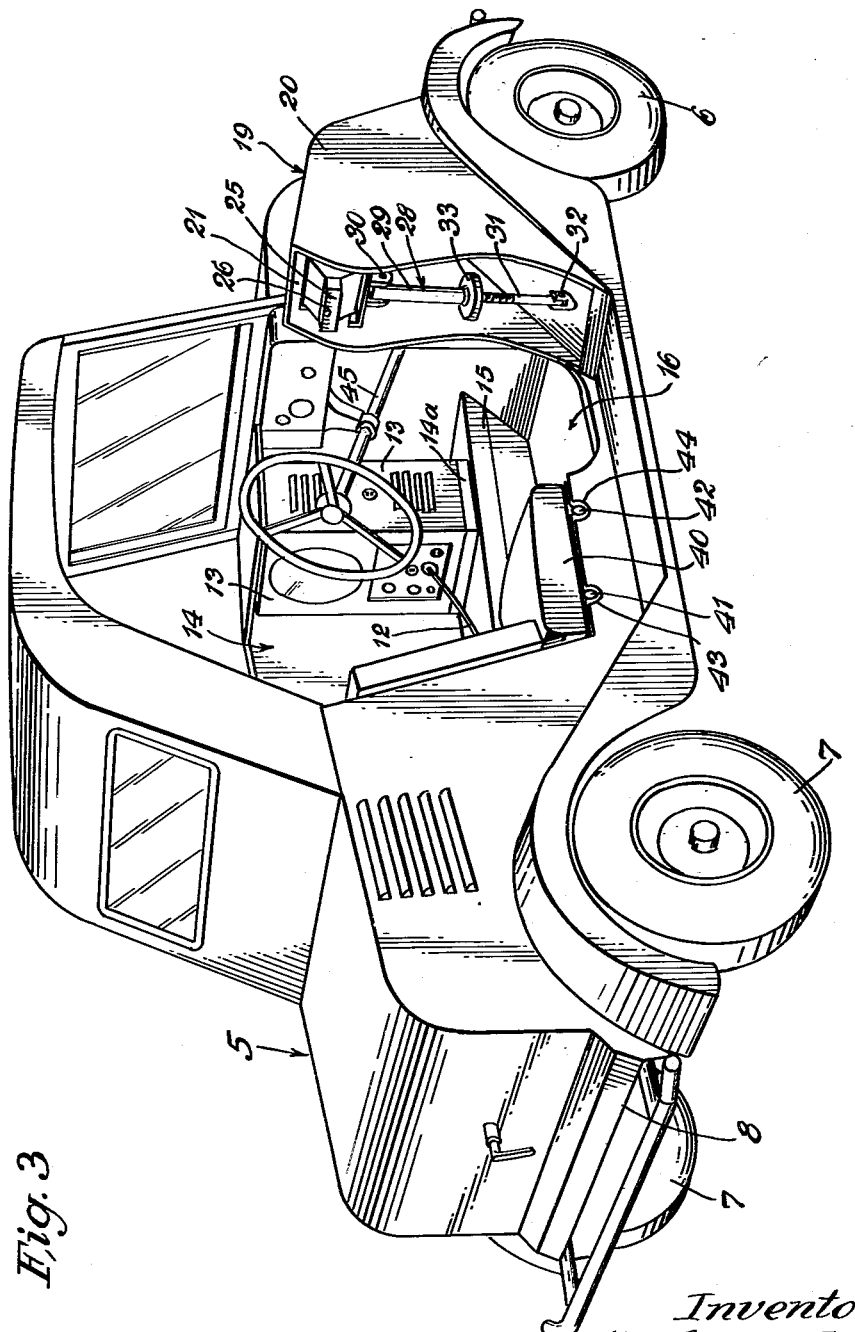

Aug. 8, 1961     C. M. ANGEL ET AL     2,995,032
MOBILE AXLE FLAW DETECTOR UNIT CARRIER

Filed June 7, 1955     3 Sheets-Sheet 3

Inventors
Charles M. Angel
Edward R. Hauer
by Parker & Carter
Attorneys

United States Patent Office 2,995,032
Patented Aug. 8, 1961

2,995,032
MOBILE AXLE FLAW DETECTOR UNIT CARRIER
Charles M. Angel, 211 W. 11th Ave., Huntington, W. Va., and Edward R. Hauer, 7312 Normandy Drive, Richmond, Va.
Filed June 7, 1955, Ser. No. 513,686
1 Claim. (Cl. 73—67.8)

This invention is directed to a new and improved testing vehicle for detecting flaws and fissures in the supporting axles for railroad rolling stock.

One purpose of the present invention is the provision of an improved apparatus for testing the supporting axles of rolling stock for flaws and fissures without the necessity of removing the axles from their associated bearing structure on the rail vehicles.

Another purpose is a novel and improved testing vehicle for detecting flaws in the axles of railroad rolling stock.

Another purpose is a compact and simple testing vehicle structure.

Another purpose is a novel supporting arrangement of an indicating unit on a testing vehicle.

Other purposes will appear from time to time in the course of the ensuing specification and claims.

Referring generally now to the drawings:

FIGURE 1 is a diagrammatic illustration in elevation of our improved testing vehicle and its association with railroad rolling stock;

FIGURE 2 is a plan view on an enlarged scale of a portion of the assembly shown in FIGURE 1;

FIGURE 3 is a perspective illustration of the vehicle illustrated in FIGURE 1.

Like elements are designated by like characters throughout the specification and drawings.

Figure 4:
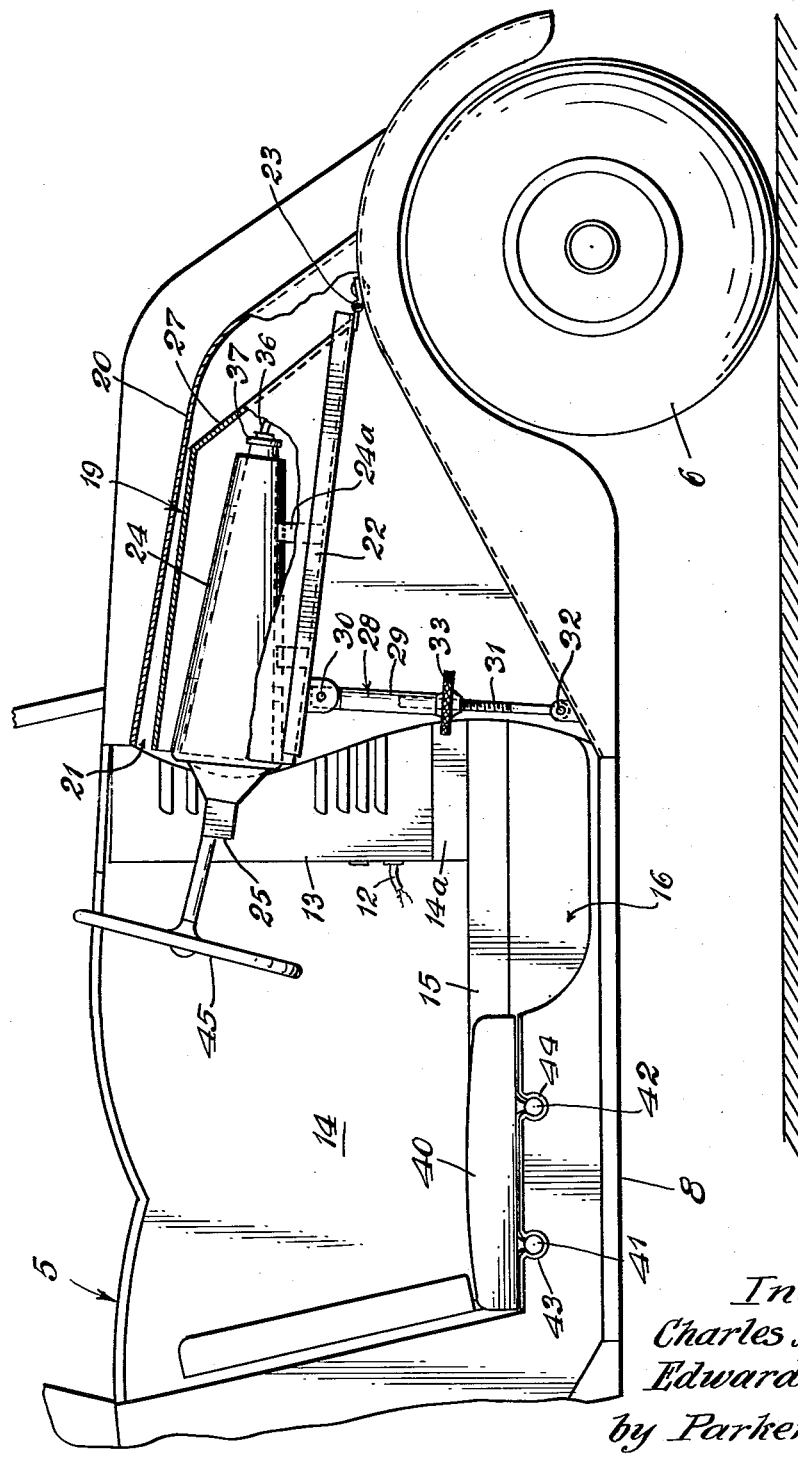
FIGURE 4 is a detail view, with parts broken away for purposes of clarity, illustrating the novel indicating unit and support therefor.

Referring specifically now to the drawings and in the first instance to FIGURE 1, we illustrate a plurality of rail vehicles 1 and 2 which are supported on the customary rails 3 of the railroad track. Each of the vehicles 1 and 2 are shown as provided with the customary supporting trucks 4.

According to the invention we provide a testing vehicle designated generally at 5 which is adapted for propulsion alongside the supporting rails for the vehicles 1 and 2. The vehicle 5 is provided with front and rear supporting wheels 6 and 7 respectively mounted on a frame 8. In FIGURE 2 it will be seen seen that an internal combustion engine 9 is provided at the rear of the frame. Any suitable transmission 10 may couple the engine to the axis for the rear wheels 7. A generator 11 is located at the rear of the frame alongside the engine 9 and may be adapted to be driven by the engine 9. The generator 11 may also be driven by a separate internal combustion engine in lieu of being driven by engine 9.

The generator 11 supplies electric power through any suitable electrical connection 12 to a testing unit 13. It should be noted that the testing unit 13 is mounted forwardly of an operator compartment 14 in the vehicle and is positioned to one side of the frame. As will appear more clearly in FIGURE 3 the testing unit 13 is positioned on a pad 14a which is in turn supported on a frame element 15. The operator compartment 14 and the side access opening 16 are made sufficiently large with relation to the size of the testing unit 13 that the unit 13 may be removed by simply withdrawing it from its position illustrated in FIGURE 3 and moving it through the access opening 16.

Preferably the testing unit 13 takes the form of an electronic sound pulse generator to produce high frequency sound waves. The unit 13 may, for example, embody principles disclosed in U.S. Patent No. 2,398,701 to F. A. Firestone. The unit may include a cable 17 which leads to a transducer 18 in the form of a piezo-quartz crystal. The cable 17 extends through the operator compartment to allow manipulation of the crystal, by the operator, at a position at one side of the vehicle. Thus the testing unit 13 may transmit high frequency sound waves through the crystal 18 to the material to be tested.

Positioned on the other side of the vehicle frame is an indicating unit designated generally at 19. The indicating unit includes means for indicating the presence of a flaw or fissure in the material being tested. As will be seen best in FIGURES 3 and 4, a casing 20 is formed on the side of the vehicle and includes a rearwardly facing opening 21. A supporting pan or shelf 22 is positioned in the casing and is hingedly mounted on the forward portion of the frame as at 23. We prefer to use a cathode ray tube 24 to indicate the presence of a flaw or fissure in the material being tested. The cathode ray tube may include an indicating scale 25 having calibrations designated generally at 26 to give a reading of the distance of the flaw or fissure from the quartz crystal. It should be noted that a protective housing 27 together with the pan 22 encloses the tube 24 and that suitable supporting members 24a are positioned between the tube 24 and shelf 22.

In order to raise and lower the indicating tube we provide an extensible member 28 which is positioned rearwardly of the hinge 23. In the embodiment shown this extensible member includes a sleeve 29 which is pivotally connected as at 30 with the pan 22 and a threaded rod 31 which is pivotally connected as at 32 on the frame. A manually actuable handle 33 is threadably engaged with the rod 31 and abuts against the lower portion of the sleeve 29. Thus the operator of the system by rotating the member 33, may adjust the spatial relation of the pivot points 30 and 32 and thereby raise and lower the dial 25. A detachable electrical cable 36 connects the tube 24 with the pulse generator 13. The cable 36 may be connected to the end of the tube 24 by any suitable detachable connection indicated diagrammatically at 37. The cable 36 may be connected to the pulse generator by similar detachable connections indicated diagrammatically at 38. The details of such detachable connections may take any one of several well known forms and for this reason they are indicated diagrammatically.

The operator seat 40 is mounted in the compartment 14 and includes downwardly extending guide members 41 and 42 riding in tracks 43 and 44 which extend transversely of the vehicle. Thus the operator while positioned on the seat 40 may move himself laterally outwardly of the frame on that side of the frame carrying the indicating unit. Preferably the seat 40 is positioned at a heighth within the vehicle such that when the vehicle 5 is driven along the rails 3 of the track it is convenient for the operator by extending his arm, to bring the crystal 18 into contact with the end faces of the supporting axles of the rail vehicles 1 and 2.

Any suitable steering assembly 45 is positioned between the pulse generator 13 and the indicating unit 25. The position of the steering assembly is such that it can be manipulated conveniently by the operator while the operator is positioned on the seat 40. It should be understood that suitable controlling elements such as the customary brake clutch and throttle (not shown) are provided for control over the propulsion of the vehicle.

The use and operation of our invention is as follows:

We provide a unique method of testing metallic materials such as the supporting axles of railroad vehicles. We have found that we are able to detect flaws in the axles without the necessity of disassembling the wheels from their associated bearing structure. We support a testing unit for movement along the plane generally parallel to the plane of the rails and at a fixed predetermined heighth with respect to the rails. The operator using the equipment stops the vehicle and the testing unit along side each car axle as is indicated at 46 in FIGURE 2 and brings the transducer crystal 18 into contact with the end face 47 of the axle. The crystal 18 transmits high frequency sound waves through the axle. If a crack or fissure is located in the axle at some point intermittent its ends the sound waves are reflected back and a "pip" will appear on the cathode tube at a position aligned with a particular calibration on the scale 25. After testing one axle the unit is moved to a position alongside the next succeeding axle and the testing procedure is repeated. Thus flaws in the supporting axles of rail vehicle may be tested while they are in the yards and flaws and fissures will be detected so that the axles may be removed and replaced.

We provide an extremely compact arrangement of a testing vehicle. We separate the indicating unit from the sound pulse generating unit and establish a detachable connection between the two so that either may be removed for use in other locations. Under some circumstances the cable may be permanently connected to the tube 24 and detachably connected to the generating unit 13, thus allowing removal of the unit 13 while keeping the tube 24 in position. The indicating unit is preferably positioned and adjusted to a height such that the operator, while positioned on the seat 40, may conveniently read the scale. The scale or dial may be raised and lowered to meet the individual operator eye-level by merely rotating the member 33. The operator of the vehicle may extend himself laterally outwardly of the vehicle by sliding the seat 40 outwardly to the position shown in FIGURE 2. The degree of sliding movement and the final position of the seat 40, of course, will depend upon the desires of the operator in manipulating the testing transducing crystal 18.

As formed, the vehicle permits the operator, while seated on the seat 40, to steer the vehicle with one hand while allowing manipulation of the adjusting member 33 and operation of the transducer crystal 18 with the other. The operator may perform the steering function and the testing function while positioned at any extended position of the seat 40. Under some circumstances the operator may wish to extend himself laterally toward the axle being tested when the vehicle is stopped at the test site and then move himself inwardly for steering the vehicle to the next test site.

We wish it to be understood that the use of a high frequency sound pulse generator and transducer crystal such as we have diagrammatically represented in the drawings are known to the art although we believe the particular arrangement thereof to be new to the art.

Whereas we have shown and described an operative form of our invention we wish it to be understood that there are modifications of the invention that will fall within the spirit of the invention and which will be apparent to those skilled in the art. The showing and description should be taken in an illustrative or diagrammatic sense only and not in any limiting sense. The scope of the invention should be limited only by the scope of the hereinafter appended claim.

We claim:

A mobile assembly for testing the axles of railroad cars in place, including a wheeled frame adapted for longitudinal movement alongside a railroad track, power means on the frame for propelling it and for generating electrical energy, a high frequency sound testing unit supported on the frame and connected to the power means to receive electrical energy therefrom, an operator supporting seat on the frame at a predetermined height with respect to the axles of the railroad cars, a lateral track on the frame, the seat being movable laterally along the lateral track between an inner normal position and a laterally extended outer testing position beyond the lateral confines of the frame, the testing unit including indicating means disposed on one side of the frame opposite the lateral track and intermediate the ends thereof so that in any position of the seat, an operator on the seat may view the indicating means; and a high frequency sound transmitting crystal connected to the testing unit by a cable of sufficient length to allow the operator to apply the crystal to the end faces of car axles when the seat is in the laterally extended outer testing position.

References Cited in the file of this patent

UNITED STATES PATENTS

| | | |
|---|---|---|
| 2,592,134 | Firestone | Apr. 8, 1952 |
| 2,622,131 | McKee et al. | Dec. 16, 1952 |
| 2,672,753 | Drake | Mar. 23, 1954 |

OTHER REFERENCES

Publication: Instruments, December 1946, article by J. W. Dice on pp. 718–722.